(12) United States Patent
Li et al.

(10) Patent No.: US 9,231,856 B2
(45) Date of Patent: Jan. 5, 2016

(54) METHOD FOR DETECTING MESSAGE LOOP, ROUTING AGENT APPARATUS AND NETWORKING SYSTEM

(71) Applicant: Huawei Technologies Co., Ltd., Shenzhen, Guangdong (CN)

(72) Inventors: Chunsheng Li, Shenzhen (CN); Bingcai Zhang, Shenzhen (CN); Bin Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 13/787,075

(22) Filed: Mar. 6, 2013

(65) Prior Publication Data

US 2013/0183962 A1    Jul. 18, 2013

Related U.S. Application Data

(63) Continuation of application No. PCT/CN2011/083564, filed on Dec. 6, 2011.

(30) Foreign Application Priority Data

Dec. 7, 2010   (CN) .......................... 2010 1 0590396

(51) Int. Cl.
   *H04J 3/14* (2006.01)
   *H04L 12/705* (2013.01)

(52) U.S. Cl.
   CPC ...................................... *H04L 45/18* (2013.01)

(58) Field of Classification Search
   CPC ..... H04L 45/28; H04L 45/22; H04L 41/0654; H04L 43/50; H04L 12/2697; H04J 3/14
   See application file for complete search history.

(56) References Cited

U.S. PATENT DOCUMENTS

| 5,862,129 A | 1/1999 | Bell et al. |
| 2002/0176370 A1* | 11/2002 | Ohba et al. ................... 370/252 |

(Continued)

FOREIGN PATENT DOCUMENTS

| CN | 101001411 A | 7/2007 |
| CN | 101159780 A | 4/2008 |
| CN | 101730027 A | 6/2010 |
| CN | 102143018 A | 8/2011 |
| EP | 1215854 A2 | 6/2002 |

OTHER PUBLICATIONS

Extended European Search Report in corresponding European Patent Application No. 11846804.0 (Jun. 21, 2013).

(Continued)

*Primary Examiner* — Andrew Lee
(74) *Attorney, Agent, or Firm* — Leydig, Voit & Mayer, Ltd.

(57) ABSTRACT

A method for detecting a message loop, a routing agent apparatus, and a networking system. The method for detecting a message loop includes: receiving a request message sent by a network element apparatus; acquiring routing information for sending the request message to a server apparatus; detecting whether a next-hop link for sending the request message in the routing information and a link for receiving the request message belong to a same link set; and sending a response to the network element apparatus that a message loop is detected, when it is detected that the link for sending the request message in the routing information and the link for receiving the request message belong to a same link set. The technical solutions disclosed herein can improve the efficiency of detecting the message loop and thus have strong practicability.

17 Claims, 5 Drawing Sheets

(56) References Cited

U.S. PATENT DOCUMENTS

| | | | |
|---|---|---|---|
| 2003/0225906 A1* | 12/2003 | Natarajan et al. | 709/238 |
| 2004/0264675 A1 | 12/2004 | Delaney et al. | |
| 2005/0050221 A1* | 3/2005 | Tasman et al. | 709/232 |
| 2006/0159034 A1* | 7/2006 | Talur et al. | 370/254 |
| 2007/0025355 A1* | 2/2007 | Cohen et al. | 370/392 |
| 2007/0217420 A1* | 9/2007 | Raj et al. | 370/392 |
| 2008/0056137 A1* | 3/2008 | Ravindran et al. | 370/238 |
| 2008/0304417 A1 | 12/2008 | Liu et al. | |
| 2009/0180401 A1* | 7/2009 | Guan | 370/255 |
| 2009/0210523 A1* | 8/2009 | Duggan | 709/223 |
| 2011/0261702 A1* | 10/2011 | Shimonishi | 370/249 |
| 2012/0014388 A1* | 1/2012 | Shinohara et al. | 370/400 |

OTHER PUBLICATIONS

Written Opinion of the International Searching Authority in corresponding PCT Patent Application No. PCT/CN2011/083564 (Dec. 7, 2010).

$1^{st}$ Office Action in corresponding Chinese Patent Application No. 201010590396.1 (Jan. 29, 2013).

International Search Report in corresponding PCT Patent Application No. PCT/CN2011/083564 (Mar. 15, 2012).

Calhoun, et al., "Diameter Base Protocol," Sep. 2003, The Internet Society, Reston, Virginia.

\* cited by examiner

METHOD FOR DETECTING MESSAGE LOOP, ROUTING AGENT APPARATUS AND NETWORKING SYSTEM

CROSS-REFERENCE TO RELATED APPLICATIONS

This application is a continuation of International Patent Application No. PCT/CN2011/083564, filed on Dec. 6, 2011, which claims priority to Chinese Patent Application No. 201010590396.1, filed on Dec. 7, 2010, both of which are hereby incorporated by reference in their entireties.

FIELD OF TECHNOLOGY

Embodiments of the present invention relate to the field of communication techniques, and particularly, to a method for detecting a message loop, routing agent apparatus and networking system.

BACKGROUND

Diameter protocol, which uses stream control transmission protocol (Stream Control Transmission Protocol, referred to as SCTP) or transmission control protocol (Transmission Control Protocol, referred to as TCP) as an underlying protocol, is the protocol broadly applied in policy and charging control (Policy and Charging Control, referred to as PCC) architecture of the 3rd generation mobile communication technology network, and network of long term evolution (Long Term Evolution, referred to as LTE) and IMS, IP multimedia subsystem (IP Multimedia Subsystem, referred to as IMS) network. In the Diameter protocol, a Diameter routing agent (Diameter Routing Agent, referred to as DRA) provides the functionality of message routing of Diameter signaling, and the DRA is deployed for constructing a next generation signaling network.

In the signaling network, a message loop in a DRA is a major defect affecting regular services of the network. For preventing the message loop, it is required that a peer identity for a received message is added into a route-record (Route-Record) attribute value pair (Attribute Value Pair, referred to as AVP) of the received message, when a DRA forwards the received message. When the DRA receives a Diameter request message, it is checked firstly as to whether the Route-Record AVP of the request message has an identity of the DRA. If the Route-Record AVP of the request message has the identity of the DRA, it means a message loop occurs, and the DRA sends a response message of DIAMETER_LOOP_DETECTED. The response message is returned back to a client (Client) along the same route to inform the Client of a problem occurring at the route.

The above-mentioned method for detecting a message loop in the prior art can better detect a message loop among more than three DRA apparatuses. However, for a message loop between two DRA apparatuses, for example, a DRA 1 receives a Diameter request message sent by a Client, and sends the Diameter request message to a DRA 2, where an identity of the Client is added into the Route-Record AVP in the Diameter request message by the DRA 1. The DRA 2 then sends the Diameter request message to the DRA 1, where an identity of the DRA 1 is added into the Route-Record AVP in the Diameter request message. Upon the DRA 1 receives the Diameter request message, the DRA 1 detects that the Route-Record AVP in the Diameter request message has the identity of the DRA 1. Thus, the DRA 1 determines that a message loop occurs. It is required that the DRA 1 firstly return a response message of DIAMETER_LOOP_DETECTED to the DRA 2 along the same route, then the DRA 2 returns the response message of DIAMETER_LOOP_DETECTED to the DRA 1, and then the DRA 1 returns the response message of DIAMETER_LOOP_DETECTED to the Client. Processing efficiency for such a method for detecting a message loop between two DRA is low.

SUMMARY

Embodiments of the present invention provide a method for detecting a message loop, a routing agent apparatus, and a networking system. Some embodiments address the defect of low processing efficiency for the method for detecting a message loop between a network element apparatus and a routing agent apparatus in the prior art.

One embodiment of the present invention provides a method for detecting a message loop, comprising:
receiving a request message sent by a network element apparatus;
acquiring routing information for sending the request message to a server apparatus;
detecting whether a next-hop link for sending the request message and a link for receiving the request message belong to a same link set, wherein the next-hop link is included in the routing information; and
sending a response to the network element apparatus indicating that a message loop is detected, when it is detected that the next-hop link for sending the request message in the routing information and the link for receiving the request message belong to a same link set.

Another embodiment of the present invention provides a routing agent apparatus, comprising:
a receiving module, configured to receive a request message sent by a network element apparatus;
an acquiring module, configured to acquire routing information for sending the request message to a server apparatus;
a detecting module, configured to detect whether a next-hop link for sending the request message and a link for receiving the request message belong to a same link set, wherein the next-hop link is in the routing information; and
a sending module, configured to send to the network element apparatus a response indicating a message loop is detected, when it is detected that the link for sending the request message in the routing information and the link for receiving the request message belong to a same link set.

One embodiment of the present invention further provides a networking system, comprising: a network element apparatus and a routing agent apparatus, wherein,
the network element apparatus is configured to send a request message to the routing agent apparatus;
the routing agent apparatus is configured to: receive the request message sent by the network element apparatus and acquire routing information for sending the request message to a server apparatus; detect whether a next-hop link for sending the request message and a link for receiving the request message belong to a same link set, wherein the next-hop link is in the routing information; and send a response indicating a message loop is detected to the network element apparatus, when it is detected that the link for sending the request message in the routing information and the link for receiving the request message belong to a same link set.

The efficiency of detecting the message loop is improved using the technical solution of the embodiments of the present invention, which therefore reduces the load of additional signaling in networking, reducing signaling congestion, providing guarantee for the processing of regular services of subsequent messages, and thus having strong practicability.

BRIEF DESCRIPTION OF THE DRAWINGS

To more clearly illustrate the technical solutions in the embodiments of the present invention or in the prior art, the drawings that are required to describe the embodiments or the prior art will be simply introduced. The drawings in the following description are only some of the embodiments of the present invention. Persons skilled in the art can obtain other drawings based on these drawings without inventive work.

DETAILED DESCRIPTION

In order to make the objective, technical solution, and advantages of the embodiments of the present invention more clear, the technical solutions in the embodiments of the present invention are completely and clearly described below in conjunction with the drawings in the embodiments. The described embodiments are only some embodiments of the present invention rather than all of the embodiments. All other embodiments which are acquired by a person ordinary in the art without inventive work fall into the scope of the present disclosure.

Figure 1:
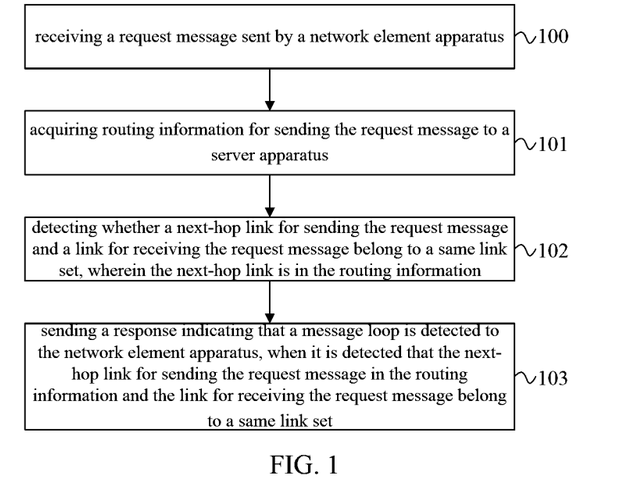
FIG. 1 is a flow diagram illustrating a method for detecting a message loop provided by Embodiment One of the present invention.

FIG. 1 is a flow diagram illustrating a method for detecting a message loop provided by Embodiment 1 of the present invention. The executor for the method for detecting the message loop in the present embodiment is DRA. As depicted in FIG. 1, the method for detecting the message loop in the present embodiment specifically comprises the following steps:

Step 100: receiving a request message sent by a network element apparatus.

Step 101: acquiring routing information for sending the request message to a server apparatus.

Step 102: detecting whether a next-hop link for sending the request message and a link for receiving the request message belong to a same link set, where the next-hop link is in the routing information.

Step 103: sending a response indicating that a message loop is detected to the network element apparatus, when it is detected that the next-hop link for sending the request message in the routing information and the link for receiving the request message belong to a same link set.

Specifically, the request message of the present embodiment can be a Diameter request message. For example, the Diameter request message can be an authentication-requesting message, or a location-reporting message, or a charging-requesting message. The DRA receives a Diameter request message sent by a network element apparatus. Then the DRA acquires routing information for sending the Diameter request message from the DRA to a server apparatus (e.g., Server), and detects whether a next-hop link for sending the Diameter request message in the routing information and a link for receiving the Diameter request message belong to a same link set. For example, there are two cases for the next-hop link sending the request message in the routing information and the link for receiving the request message belong to a same link set specifically. One case is the next-hop link for sending the request message and the link for receiving the request message belong to a same link. The other case is the next-hop link for sending the request message and the link for receiving the request message belong to different links of a same link set. For example, the next-hop link for sending the request message is sent through link 1 between the network element apparatus and the DRA, whereas the link for receiving the Diameter request message sent by the network element apparatus is link 3 between the network element apparatus and the DRA. Under the circumstance, the link 1 and the link 3 belong to different links of a same link set.

The link for receiving the Diameter request message by the DRA in the present embodiment is the link from the network element apparatus to the DRA. When the DRA detects the next-hop link for sending the Diameter request message in the acquired routing information is the link from the DRA to the network element apparatus, it is determined that the next-loop link for sending the Diameter request message in the acquired routing information and the link for receiving the Diameter request message belong to a same link set. In this case, the DRA sends a response indicating that the message loop is detected to the network element apparatus. After receiving the response indicating that the message loop is detected, the network element apparatus can reselect the routing information for the Diameter request message, and resend the Diameter request message or directly issue an alert signal which is to be processed by an operator so that expediting the services corresponding to the Diameter request message to normally run.

The method for detecting the message loop in the present embodiment can be adapted for detecting the message loop between two network elements. For example, the method can be applied for detecting the message loop between two DRAs in the networking system comprising the two DRAs and for detecting the message loop between one DRA and a client (Client). That is, the network element apparatus in the present embodiment can be a client (Client) or can be one DRA.

The method for detecting the message loop of the present embodiment is realized as: receiving a Diameter request message sent by the network element apparatus, and acquiring the routing information for sending the Diameter request message to the Server; detecting whether the next-hop link for sending the Diameter request message in the routing information and the link for receiving the Diameter request message belong to a same link set; when belonging to a same link set, sending the response indicating that the message loop is detected to the network element apparatus. The efficiency of detecting the message loop can be improved using the technical solution of the present embodiment, which therefore reduces the load of additional signaling in networking, reducing signaling congestion, providing guarantee for the processing of regular services of subsequent messages, and thus having strong practicability.

Figure 2:
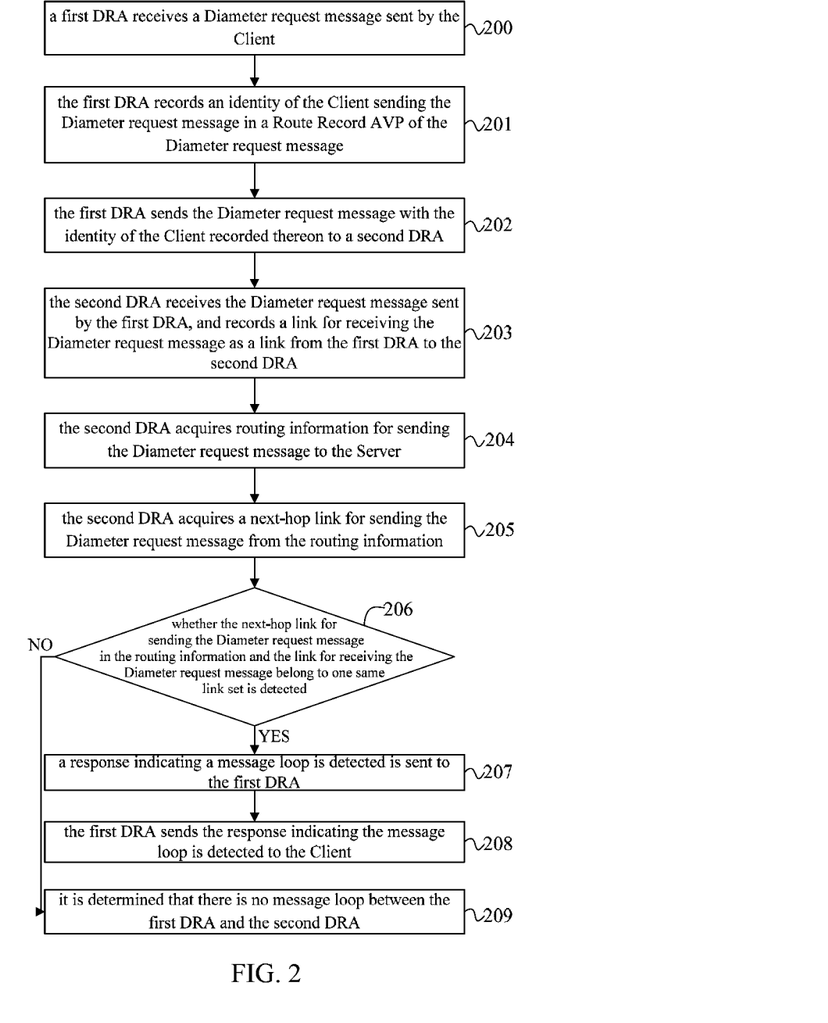
FIG. 2 is a flow diagram illustrating a method for detecting a message loop provided by Embodiment Two of the present invention.

FIG. 2 is a flow diagram illustrating a method for detecting a message loop provided by Embodiment 2 of the present invention. An applicable scenario for the method for detecting the message loop in the present embodiment occurs in the networking system composed of two DRAs, one Client and one Server. As depicted in FIG. 2, the method for detecting the message loop in the present embodiment comprises the following steps:

Step 200: a first DRA receives a Diameter request message sent by the Client, and then performs step 201.

Step 201: the first DRA records an identity of the Client sending the Diameter request message in a Route Record AVP of the Diameter request message; and then performs step 202.

Step 202: the first DRA sends the Diameter request message with the identity of the Client recorded thereon to a second DRA; and then performs step 203.

Step 203: the second DRA receives the Diameter request message sent by the first DRA, and records a link for receiving the Diameter request message as a link from the first DRA to the second DRA; and then performs step 204.

Step 204: the second DRA acquires routing information for sending the Diameter request message to the Server; and then performs step 205.

The routing information for sending the Diameter request message from the second DRA to the Server has been configured when the networking is performed. Before sending the Diameter request message, the second DRA can detect and acquire routing information corresponding to a link available for sending the Diameter request message.

Step 205: the second DRA acquires a next-hop link for sending the Diameter request message from the routing information; and then performs step 206.

Step 206: whether the next-hop link for sending the Diameter request message in the routing information and the link for receiving the Diameter request message belong to a same link set is detected; and when belonging to a same link set, step 207 is performed, or else when not belonging to a same link set, step 209 is performed.

Since the present embodiment only comprises two DRAs, there are two pieces of routing information from the second DRA to the Server. One piece is from the second DRA to the Server, and the other piece is from the second DRA to the first DRA then to the Server. The routing information from the second DRA to the Server is preferred. When the routing from the second DRA to the Server is not available, the routing information acquired by the second DRA is the routing information from the second DRA to the first DRA then to the Server. In this case, the next-hop link for sending the Diameter request message by the second DRA is a link from the second DRA to the first DRA. Thus, in this case, whether the next-hop for sending the Diameter request message in the routing information is directed to the second DRA can also be detected; and when the next-hop for sending the Diameter request message in the routing information is directed to the second DRA, it is determined that the next-hop link for sending the Diameter request message in the routing information and the link for receiving the Diameter request message belong to a same link set. When the routing from the second DRA to the Server is available, the routing information acquired by the second DRA can be only the routing information from the second DRA to the Server, and the next-hop link for sending the Diameter request message and the link for receiving the Diameter request message do not belong to a same link set.

Step 207: a response indicating a message loop is detected is sent to the first DRA; and step 208 is performed.

Step 208: the first DRA sends the response indicating the message loop is detected to the Client.

Step 208 is used for sending the response indicating the message loop is detected to the Client, to inform the Client about the occurrence of the message loop. The Client can reselect the routing for the Diameter request message for resending. In practical use, step 208 may alternatively not by conducted; but directly after step 207, upon the first DRA receives the response indicating the message loop is detected, the routing for sending the Diameter request message starts to be reselected from the first DRA or an alert is directly to be made so that a corresponding processing is performed by an operator.

Step 209: it is determined that there is no message loop between the first DRA and the second DRA.

For example, when the second DRA determines there is no message loop between the first DRA and the second DRA, the Diameter request message would continuously be forwarded according to the next-hop link for sending the Diameter request message in the routing information, or alternatively other operations can be performed.

The method for detecting the message loop of the present embodiment is realized as: receiving the Diameter request message sent by the first DRA, and acquiring the routing information for sending the Diameter request message to the Server; detecting whether the link for sending the Diameter request message in the routing information and the link for receiving the Diameter request message belong to a same link set, and when belonging to a same link set, sending the response indicating the message loop is detected to the first DRA; and sending, by the first DRA, the response indicating the message loop is detected to the Client. The efficiency of detecting the message loop can be improved using the technical solution of the present embodiment, which therefore reduces the load of additional signaling in networking, reducing signaling congestion, providing guarantee for the processing of regular services of subsequent messages, and thus having strong practicability.

Figure 3:
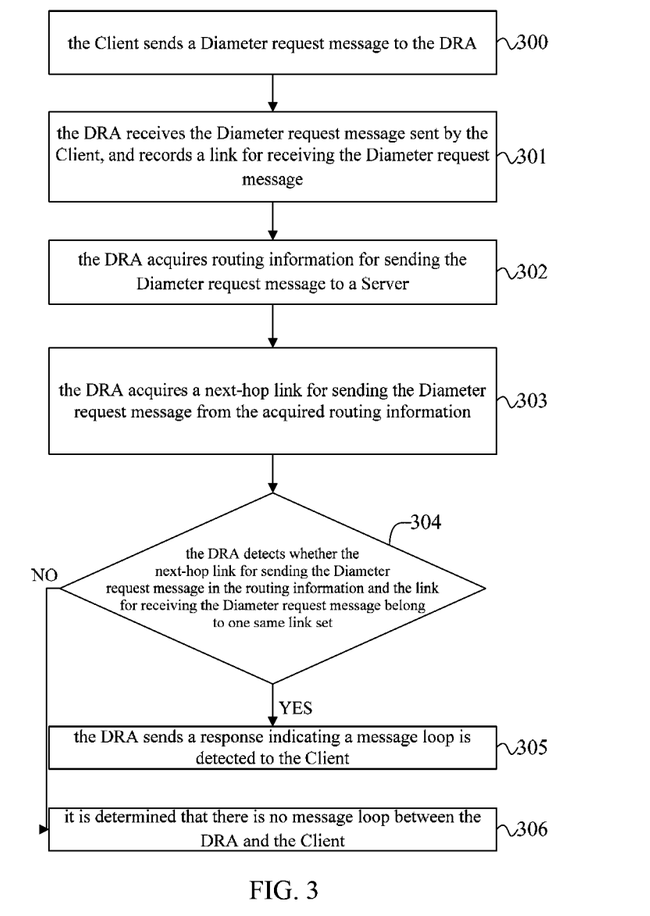
FIG. 3 is a flow diagram illustrating a method for detecting a message loop provided by Embodiment Three of the present invention.

FIG. 3 is a flow diagram illustrating a method for detecting a message loop provided by Embodiment 3 of the present invention. An applicable scenario for the method for detecting the message loop in the present embodiment occurs between a DRA and a Client. As depicted in FIG. 3, the method for detecting the message loop in the present embodiment comprises the following steps:

Step 300: the Client sends a Diameter request message to the DRA.

Step 301: the DRA receives the Diameter request message sent by the Client, and records a link for receiving the Diameter request message.

Step 302: the DRA acquires routing information for sending the Diameter request message to a Server.

Step 303: the DRA acquires a next-hop link for sending the Diameter request message from the acquired routing information.

Step 304: the DRA detects whether the next-hop link for sending the Diameter request message in the routing information and the link for receiving the Diameter request message belong to a same link set. When belonging to a same link set, step 305 is performed, or else when not belonging to a same link set, step 306 is performed.

When there is an error in the routing information preconfigured in a networking, the routing information from the DRA to the Server may be incorrectly configured as routing information from the DRA to the Client and then directly or indirectly from the Client to the Server. In this case, the DRA detects the next-hop link for sending the Diameter request message in the routing information is a link from the DRA to the Client. Whereas the link for receiving the Diameter message request by the DRA is a link from the Client to the DRA. Thus, it can be determined that the next-hop link for sending the Diameter request message in the routing information and the link for receiving the Diameter request message belong to a same link set. When the routing information pre-configured in the networking is correct, the above case generally would not occur, the next-hop link for sending the Diameter request message in the routing information and the link for receiving the Diameter request message not belonging to a same link set.

Step 305: the DRA sends a response indicating a message loop is detected to the Client.

Step 306: it is determined that there is no message loop between the DRA and the Client.

For example, when the DRA determines that there is no message loop between the DRA and the Client, the Diameter request message would continuously be forwarded according to the next-hop link for sending the Diameter request message in the routing information, or alternatively other operations can be performed.

The method for detecting the message loop of the present embodiment is realized as: receiving the Diameter request message sent by the Client, and acquiring the routing information for sending the Diameter request message to the Server; detecting whether the link for sending the Diameter request message in the routing information and the link for receiving the Diameter request message belong to a same link set, and when belonging to a same link set, sending the response indicating the message loop is detected to the first DRA; and sending, by the first DRA, the response indicating the message loop is detected to the Client. The efficiency of detecting the message loop can be improved using the technical solution of the present embodiment, which therefore reduces the load of additional signaling in networking, reducing signaling congestion, providing guarantee for the processing of regular services of subsequent messages, and thus having strong practicability.

Figure 4:
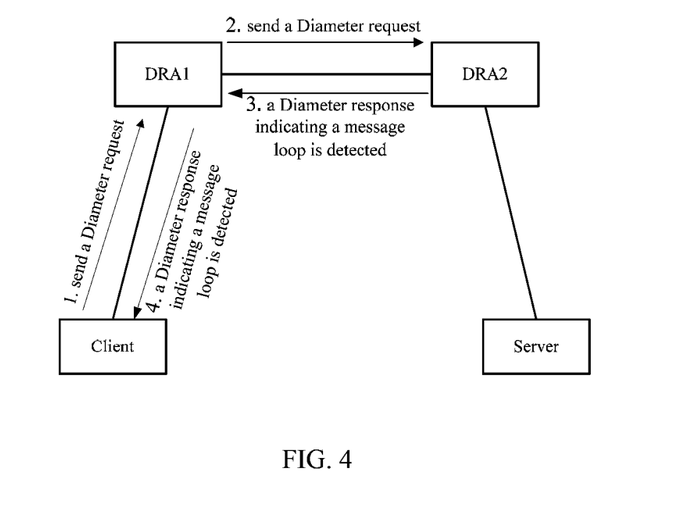
FIG. 4 is a diagram for the networking structure comprising two DRAs provided by Embodiment Four of the present invention.

FIG. 4 is a diagram for the networking structure comprising two DRAs provided by Embodiment 4 of the present invention. Herein, a method for detecting a message loop of the present invention is described in detail using the two DRAs in the networking structure as shown in FIG. 4.

As depicted in FIG. 4, the networking structure comprises DRA 1 and DRA 2 as well as a client (Client) and a server (Server). The signaling interaction between them comprises the following steps:

Step 1: the Client apparatus initiates a Diameter request.

Step 2: the DRA 1 receives the Diameter request from the Client, to select routing for a message. For a disaster-tolerant networking composed of the DRA 1 and the DRA 2, there are two routing from the DRA 1 to the Server. The two routing includes routing 1 from the DRA 1 to the Server and routing 2 from the DRA 1 to the DRA 2 then to the Server. Wherein, the routing 1 is a preferred routing and the routing 2 is a reserved routing. When the DRA 1 discovers a link for the routing 1 is not available (specifically for example, a data configuration error results in unavailable routing or a broken link results in unavailable routing), the reserved routing 2 is selected. Then the DRA 1 sends the Diameter request to the DRA 2 according to the reserved routing 2.

Step 3: after the DRA 2 receives the Diameter request from the DRA 1, a Diameter link (from the DRA 1 to DRA 2) for receiving the message is recorded. The routing for the message is selected. For the disaster-tolerant networking composed of the DRA 1 and the DRA 2, there are two routing from the DRA 2 to the Server. The two routing from the DRA 2 to the server includes routing 1 from the DRA 2 to the Server and routing 2 from the DRA 2 to the DRA 1 then to the Server.

In one embodiment, the routing 1 is a preferred routing and the routing 2 is a reserved routing. When the DRA 2 discovers a link for the routing 1 is not available (specifically, for example, a data configuration error results in unavailable routing or a broken link results in unavailable routing), the reserved routing 2 is selected. However, after the DRA 2 selects the reserved routing 2, the DRA 2 can detect a next-hop link of the reserved routing 2 is from the DRA 2 to the DRA 1. Whereas a link for receiving the Diameter request recorded by the DRA 2 is from the DRA 1 to DRA 2. By comparing, the two links are found to be same. Thus, the DRA 2 can then determine there is a message loop between the DRA 1 and DRA 2. Then the DRA 2 returns a Diameter response indicating the message loop is detected to the DRA 1. Specifically, the Diameter response indicating the message loop is detected comprises an error code that is loop-detect (Loop-Detect) or unable-to-deliver (Unable-to-Deliver).

Step 4: the DRA 1 receives the Diameter response indicating the message loop is detected from the DRA 2, such as a Loop-Detect response, and sends the Loop-Detect response to the Client to inform the Client.

The method for detecting the message loop of the present embodiment can be adapted to a base networking comprising two DRA apparatuses, and have strong practicability.

In contrast to the prior art, the method for detecting the message loop of the present embodiment can reduce the interaction between the two DRAs, and send the response indicating the message loop is detected to the Client as soon as possible. Therefore, the present embodiment may improve the efficiency of detecting the message loop; then reduce the load of additional signaling in networking, reduce signaling congestion, provide guarantee for the processing of regular services of subsequent messages, and thus have strong practicability.

Those ordinary in the art can understand that, all or part of the steps of the above-mentioned method embodiments can be implemented by the program which instructs related hardware. The program can be stored in a computer-readable storage media, and when being executed, perform the steps in the above-mentioned method embodiments; and the computer-readable storage media comprises various media that can store program codes, such as ROM, RAM, disc or optic, etc.

Figure 5:
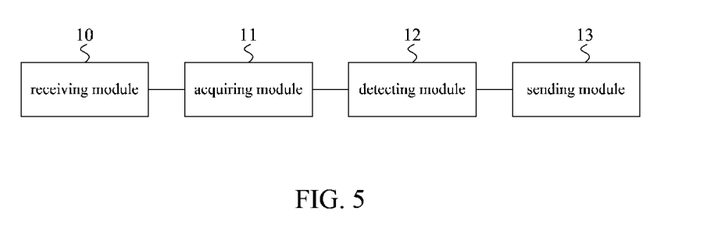
FIG. 5 is a schematic diagram illustrating the structure of a routing agent apparatus provided by Embodiment Five of the present invention.

FIG. 5 is a schematic diagram illustrating the structure of a routing agent apparatus provided by Embodiment 5 of the present invention. The routing agent apparatus of the present embodiment can be referred as a message routing agent apparatus, for example, it specifically can be a DRA. The routing agent apparatus of the present embodiment specifically comprises a receiving module 10, an acquiring module 11, a detecting module 12, and a sending module 13.

The receiving module 10 in the routing agent apparatus of the present embodiment is configured to receive a request message sent by a network element apparatus. The acquiring module 11 is connected with the receiving module 10, and is configured to acquire routing information for sending the request message received by the receiving module 10 to a server apparatus. The detecting module 12 is connected with the acquiring module 11, and is configured to detect whether a next-hop link for sending the request message in the routing information acquired by the acquiring module 11 and a link for receiving the request message belong to a same link set.

The sending module 13 is connected with the detecting module 12, and is configured to send a response indicating a message loop is detected to the network element apparatus, when it is detected by the detecting module 12 that the link for sending the request message in the routing information and the link for receiving the request message belong to a same link set.

The routing agent apparatus of the present embodiment implements the same scheme for detecting the message loop through the above-mentioned modules, as compared with that implemented in the above-mentioned related method embodiments. The disclosure of the above-mentioned related method embodiments are detailed for reference, and thus will not described again herein.

The request message in the present embodiment can be a Diameter request message. Wherein, it comprises two cases whether the next-hop link for sending the request message in the routing information acquired by the acquiring module 11 and the link for receiving the request message belong to a same link set detected by the detecting module 12. The details can be referred to from the disclosure of the above-mentioned related method embodiments.

The routing agent apparatus of the present embodiment implements through the above-mentioned modules: receiving a request message sent by a network element apparatus, and acquiring routing information for sending the request message to a Server; detecting whether the next-hop link for sending the request message in the routing information and the link for receiving the request message belong to a same link set, and sending a response indicating a message loop is detected to the network element apparatus, when belonging to a same link set. The efficiency of detecting the message loop is improved using the technical solution of the present embodiment, which therefore reduces the load of additional signaling in networking, reducing signaling congestion, providing guarantee for the processing of regular services of subsequent messages, and thus having strong practicability.

Figure 6:
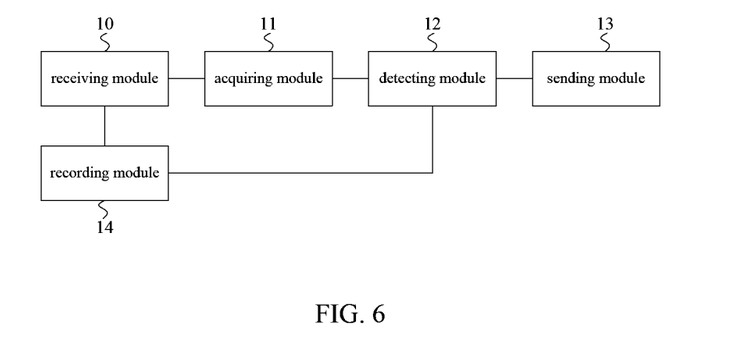
FIG. 6 is a schematic diagram illustrating the structure of a routing agent apparatus provided by Embodiment Six of the present invention.

FIG. 6 is a schematic diagram illustrating the structure of a routing agent apparatus provided by Embodiment 6 of the present invention. As depicted in FIG. 6, the routing agent apparatus of the present embodiment can specifically further comprise a recording module 14, based on the routing agent apparatus described by Embodiment 5. The recording module 14 is connected with the receiving module 10, and is configured to record the link for receiving the request message by the receiving module 10.

After acquiring the routing information for sending the request message to the server apparatus, wherein the request message is received by the receiving module 10, the acquiring module 11 is further configured to acquire the next-hop link for sending the request message from the acquired routing information. Then the detecting module 12 can be connection with the recording module 14 and the acquiring module 11, respectively. The detecting module 12 is configured to detect whether the next-hop link for sending the request message acquired by the acquiring module 11 and the link for receiving the request message recorded by the recording module 14 belong to a same link set. The sending module 13 performs as detailed in the disclosure of the above-mentioned embodiments, and thus will not be described again herein.

In the above-mentioned embodiments, the receiving module 10 receives the request message sent from a network element apparatus. The network element apparatus herein can also be a routing agent apparatus, or a client (Client).

The routing agent apparatus of the present embodiment implements the same scheme for detecting the message loop through the above-mentioned modules, as compared with that implemented in the above-mentioned related method embodiments. The disclosure of the above-mentioned related method embodiments are detailed for reference, and thus will not described again herein.

The routing agent apparatus of the present embodiment implements the detecting of the message loop through the above-mentioned modules, thus can improve the efficiency of detecting the message loop, then reduce the load of additional signaling in networking, reduce signaling congestion, provide guarantee for the processing of regular services of subsequent messages, and thus have strong practicability.

In the above-mentioned embodiments, the detecting module 12 is specifically configured to detect whether the next-hop for sending the request message is directed to the network element apparatus, wherein the next-hop is in the routing information acquired by the acquiring module 11. For example, once the next-hop link for sending the request message is acquired, a targeted network element to which the next-hop for sending the request message is directed can be acquired. When the next-hop for sending the request message in the routing information acquired by the acquiring module 11 is directed to the network element apparatus, it is determined that the link for sending the request message in the routing information and the link for receiving the request message belong to a same link set.

Figure 7:
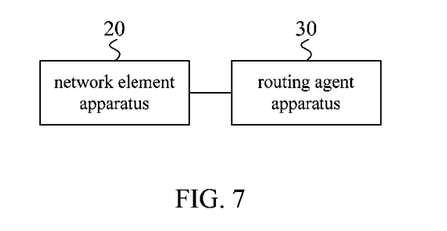
FIG. 7 is a schematic diagram illustrating the structure of a networking system provided by Embodiment Seven of the present invention.

FIG. 7 is a schematic diagram illustrating the structure of a networking system provided by Embodiment 7 of the present invention, which specifically comprises a network element apparatus 20 and a routing agent apparatus 30. The network element apparatus 20 is communicatively connected with the routing agent apparatus 30.

The network element apparatus 20 is configured to send a request message to the routing agent apparatus 30, the request message can be a Diameter request message. The routing agent apparatus 30 is configured to: receive the request message sent by the network element apparatus 20 and acquire routing information for sending the request message to a server apparatus; detect whether a next-hop link for sending the request message and a link for receiving the request message belong to a same link set, wherein the next-hop link is in the acquired routing information; send a response indicating a message loop is detected to the network element apparatus 20, when it is detected that the link for sending the request message in the routing information and the link for receiving the request message belong to a same link set.

The routing agent apparatus 30 in the present embodiment can specifically employ the routing agent apparatuses as depicted in FIG. 5 or FIG. 6. The detecting of the message loop can specifically be implemented using schemes of the above-mentioned method embodiments, which can be referred to from the disclosure of the above-mentioned related embodiments for details and thus will not repeated again.

The networking system of the present embodiment can be used for detecting whether there is message loop between the network element apparatus 20 and the routing agent apparatus 30. The network element apparatus 20 can specifically be a client apparatus or another routing agent apparatus. However, the networking system of the present embodiment is not limited to including only the network element apparatus 20 and the routing agent apparatus 30, for example, the networking system can further includes a server apparatus. According to specific requirements, the networking system of the present embodiment can further include other routing agent apparatuses, network element apparatuses, and etc.

The networking system of the present embodiment is implemented through the above-mentioned routing agent apparatus, which can improve the efficiency of detecting the message loop, then reduce the load of additional signaling in networking, reduce signaling congestion, provide guarantee for the processing of regular services of subsequent messages, and thus have strong practicability.

The apparatus embodiments as described above are merely for illustration purpose, wherein elements illustrated as separate components can be or can not be physically apart, components illustrated as elements can be or can not be physical elements, which can reside in one location or be distributed across at least two network elements. In order to implement the present embodiment, some or all of the modules can be selected as practically required, which can be understood and implemented by those ordinary in the art the embodiment without any creative work.

It is required to be noted that, the above embodiments is merely used for illustrating the technical solutions of the present invention, but being not limited to this. Although descriptions of the present invention are detailed with referent to the above-mentioned embodiments, those ordinary in the art should understand, modifications can be made to the technical solutions disclosed by various above-mentioned embodiments or alternative substitutions can be made for some technical features thereof. However, these modifications or substitutions will not cause the essence of corresponding technical solutions to depart from the spirit and scope of the technical solutions of various embodiments of the present invention.

What is claimed is:

1. A method for detecting a message loop, the method comprising:
   receiving a request message sent by a network element apparatus;
   acquiring routing information for sending the request message to a server apparatus;
   detecting whether a next-hop link for sending the request message and a link for receiving the request message belong to a same link set, wherein the next-hop link is included in the routing information; and
   sending a response to the network element apparatus indicating that a message loop is detected, when it is detected that the next-hop link for sending the request message in the routing information and the link for receiving the request message belong to the same link set.

2. The method for detecting a message loop of claim 1, further comprising:
   recording the link for receiving the request message.

3. The method for detecting a message loop of claim 1, further comprising:
   acquiring the next-hop link for sending the request message from the routing information.

4. The method for detecting a message loop of claim 3, wherein the detecting whether the next-hop link for sending the request message and the link for receiving the request message belong to the same link set comprises:
   detecting whether the next-hop for sending the request message is directed to the network element apparatus; and
   determining that the link for sending the request message and the link for receiving the request message belong to the same link set, when the next-hop for sending the request message is directed to the network element apparatus.

5. The method for detecting a message loop of claim 1, wherein the next-hop link for sending the request message and the link for receiving the request message belong to the same link set comprises:
   the next-hop link for sending the request message and the link for receiving the request message belong to the same link; or
   the next-hop link for sending the request message and the link for receiving the request message belong to different links of the same link set;
   wherein the next-hop link is in the routing information.

6. The method for detecting a message loop of claim 1, wherein the routing information for sending the request message is pre-configured in a networking, wherein the networking comprises the routing agent apparatus.

7. The method for detecting a message loop of claim 1, wherein the response indicating that a message loop is detected comprises an error code that is loop-detect or unable-to-deliver.

8. A Non-transitory computer-readable storage medium storing program codes that when executed implement a method for detecting a message loop by performing the steps of:
   receiving a request message sent by a network element apparatus;
   acquiring routing information for sending the request message to a server apparatus;
   detecting whether a next-hop link for sending the request message in the routing information and a link for receiving the request message belong to a same link set; and
   sending a response to the network element apparatus indicating a message loop is detected, when it is detected that the link for sending the request message in the routing information and the link for receiving the request message belong to the same link set.

9. The Non-transitory computer-readable storage medium of claim 8, wherein the method further includes:
   recording the link for receiving the request message.

10. The Non-transitory computer-readable storage medium of claim 8, wherein the acquiring includes acquiring the next-hop link for sending the request message from the routing information.

11. The Non-transitory computer-readable storage medium of claim 10, wherein the detecting includes:
    detecting whether the next-hop for sending the request message in the routing information is directed to the network element apparatus; and
    determining that the link for sending the request message in the routing information and the link for receiving the request message belong to the same link set, when the next-hop for sending the request message in the routing information is directed to the network element apparatus.

12. The Non-transitory computer-readable storage medium of claim 8, wherein the routing information for sending the request message is pre-configured in a networking, wherein the networking comprises the routing agent apparatus.

13. The Non-transitory computer-readable storage medium of claim 8, wherein the response indicating that a message loop is detected comprises an error code that is loop-detect or unable-to-deliver.

14. A networking system, comprising:
a network element apparatus; and
a routing agent apparatus, wherein the network element apparatus is configured to send a request message to the routing agent apparatus; wherein the routing agent apparatus is configured to:
  receive the request message sent by the network element apparatus and acquire routing information for sending the request message to a server apparatus;
  detect whether a next-hop link for sending the request message in the routing information and a link for receiving the request message belong to a same link set; and
  send a response indicating a message loop is detected to the network element apparatus, when it is detected that the link for sending the request message in the routing information and the link for receiving the request message belong to the same link set.

15. The networking system of claim 14, wherein the networking element apparatus is a client apparatus or another routing agent apparatus.

16. The networking system of claim 14, wherein the routing information for sending the request message is pre-configured in a networking, wherein the networking comprises the routing agent apparatus.

17. The networking system of claim 14, wherein the response indicating that a message loop is detected comprises an error code that is loop-detect or unable-to-deliver.

\* \* \* \* \*